US007137587B2

(12) United States Patent
Jeong et al.

(10) Patent No.: US 7,137,587 B2
(45) Date of Patent: Nov. 21, 2006

(54) SPOOL FOR WINDING OPTICAL FIBER

(75) Inventors: Chang-Woong Jeong, Kumi-shi (KR);
Yeong-Seop Lee, Kumi-shi (KR);
Ki-Tae Jung, Kumi-shi (KR)

(73) Assignee: Samsung Electronics Co., Ltd.,
Gyeonggi-Do (KR)

(*) Notice: Subject to any disclaimer, the term of this patent is extended or adjusted under 35 U.S.C. 154(b) by 56 days.

(21) Appl. No.: 10/694,977

(22) Filed: Oct. 28, 2003

(65) Prior Publication Data

US 2004/0108407 A1    Jun. 10, 2004

(30) Foreign Application Priority Data

Dec. 6, 2002    (KR) .............. 10-2002-0077170

(51) Int. Cl.
*B65H 75/14*    (2006.01)
(52) U.S. Cl. .............. 242/609.1; 242/609.4; 242/614; 242/402
(58) Field of Classification Search .......... 242/609.1, 242/609.4, 610.6, 614, 402, 165, 603, 602.2
See application file for complete search history.

(56) References Cited

U.S. PATENT DOCUMENTS

| | | | | |
|---|---|---|---|---|
| 3,966,139 A | * | 6/1976 | Terpak .............. | 242/118.7 |
| 4,997,142 A | * | 3/1991 | Grant ................ | 242/118.4 |
| 5,575,437 A | * | 11/1996 | Campbell ........... | 242/608.6 |
| 6,036,138 A | * | 3/2000 | Sexton et al. ...... | 242/608.8 |
| 6,102,327 A | * | 8/2000 | Ripplinger ......... | 242/609.1 |
| 6,305,639 B1 | * | 10/2001 | Bocciola ........... | 242/613.4 |
| 6,736,349 B1 | * | 5/2004 | Boisdon et al. .... | 242/578 |

FOREIGN PATENT DOCUMENTS

JP    50-55759    5/1975
JP    2001-522769    11/2001

* cited by examiner

*Primary Examiner*—John Q. Nguyen
*Assistant Examiner*—Sang Kim
(74) *Attorney, Agent, or Firm*—Cha & Reiter, L.L.C.

(57) ABSTRACT

A spool for winding an optical fiber includes flanges attached to each other using an ultrasonic fusion splicer. The spool has first and second cylindrical barrels, on which the optical fiber is wound. The flanges have a disk shape and protrude radially from the first and second cylindrical barrels so as to restrict the winding area of the optical fiber. Ultrasonic fusion splicing points form along a junction by engaging the first and second cylindrical barrels in an axial direction so as to face each other, locating a head of an ultrasonic fusion splicer on the junction and generating an ultrasonic wave from the head to the junction so as to fusion splice the first and second flanges together.

19 Claims, 8 Drawing Sheets

SPOOL FOR WINDING OPTICAL FIBER

CLAIM OF PRIORITY

This application claims priority to an application entitled "SPOOL FOR WINDING OPTICAL FIBER," filed in the Korean Intellectual Property Office on Dec. 6, 2002 and assigned Serial No. 2002-77170, the contents of which are hereby incorporated by reference.

BACKGROUND OF THE INVENTION

1. Field of the Invention

The present invention relates to a spool for winding an optical fiber, and more particularly to a spool for winding an optical fiber comprising flanges attached to each other using an ultrasonic fusion splicer.

2. Description of the Related Art

Recently, in order to construct an information superhighway, there is a great demand for optical fibers which are used as optical signal transmission media in optical communication systems. They are typically wound on a spool and may be provided with coating layers on their outer circumferences or may be uncoated. The spool for winding an optical fiber comprises a set of spool bodies, each body formed as a barrel having a cylindrical shape and contacting the other body, a pad attached to outer circumferences of the barrels, and a cylindrical hub formed through the spool bodies in an axial direction.

One example of the aforementioned spool for winding optical fiber is disclosed in U.S. Pat. No. 6,036,138 entitled "Spool for Holding Winding of Optical Fiber" and patented on Mar. 14, 2000. A construction of the disclosed spool is shown in FIGS. 1 and 2. The spool 1 comprises two flanges 1a and 1b, each having an outer tube 5 with a respective welding surface 4. The first and second flanges 1a, 1b are jointed together so that their welding surfaces 4 are mutually engaged, and then welded. A pad 3 is wound around the outer tubes 5, and optical fiber 6 is wound around the pad. However, the heating process for welding the flanges 1a, 1b complicates assembly of the spool 1. Further, it is impossible to disassemble the spool for re-welding if the flanges 1a, 1b were misaligned, which leads to a high defect rate for the product.

Another example of a spool for winding an optical fiber is disclosed in U.S. Pat. No. 5,908,172, entitled "Spool for Fiber Optic Media" and patented on Jun. 1, 1999. As illustrated in FIG. 3, the spool 10 comprises two flanges 11, 12 provided with winding drums 11a, 12a. The spool 10 further includes interlocking means 13 for selectively interlocking face-to-face or disengaging the winding drums 11a, 12a of the flanges 11, 12.

However, a mold is needed to manufacture the interlocking means 13, which increases the number of components. This increases assembly time and the difficulty in treating components, and, concomitantly, production cost.

SUMMARY OF THE INVENTION

The present invention has been made in view of the above problems.

According to the present invention, a spool for winding an optical fiber comprises flanges attached to each other using an ultrasonic fusion splicer, thereby reducing assembly time and improving productivity.

In another aspect of the present invention, the flanges are assembled into the spool using an ultrasonic fusion splicer, thereby reducing the number of required components and reducing the production cost.

In accordance with the present invention, the spool comprises: first and second cylindrical barrels for winding the optical fiber thereon, the barrels being axially engaged face-to-face at a juncture; first and second flanges configured for restricting the winding area of the optical fiber by being disposed to sandwich the barrels and being dimensioned to radially protrude from the barrels; and ultrasonic fusion splicing points formed along the juncture so as to fusion splice the first and second flanges together.

BRIEF DESCRIPTION OF THE DRAWINGS

The above features and other advantages of the present invention will be more clearly understood from the following detailed description taken in conjunction with the accompanying drawings, in which the same or similar elements are denoted by the same reference numerals.

DETAILED DESCRIPTION OF THE PREFERRED EMBODIMENTS

Figure 1:
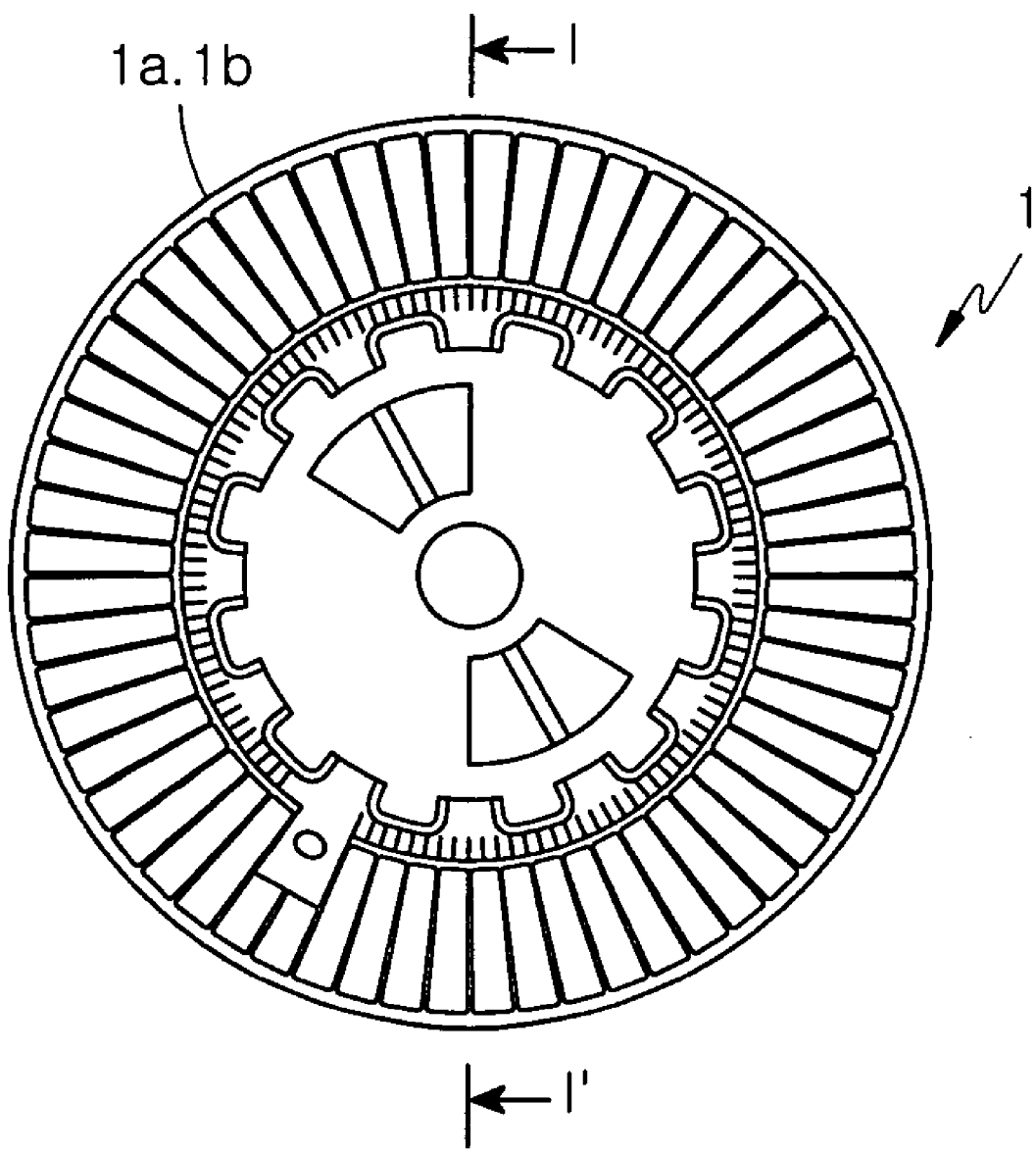
FIG. 1 is a cross-sectional view of a conventional spool for winding an optical fiber.
Figure 2:
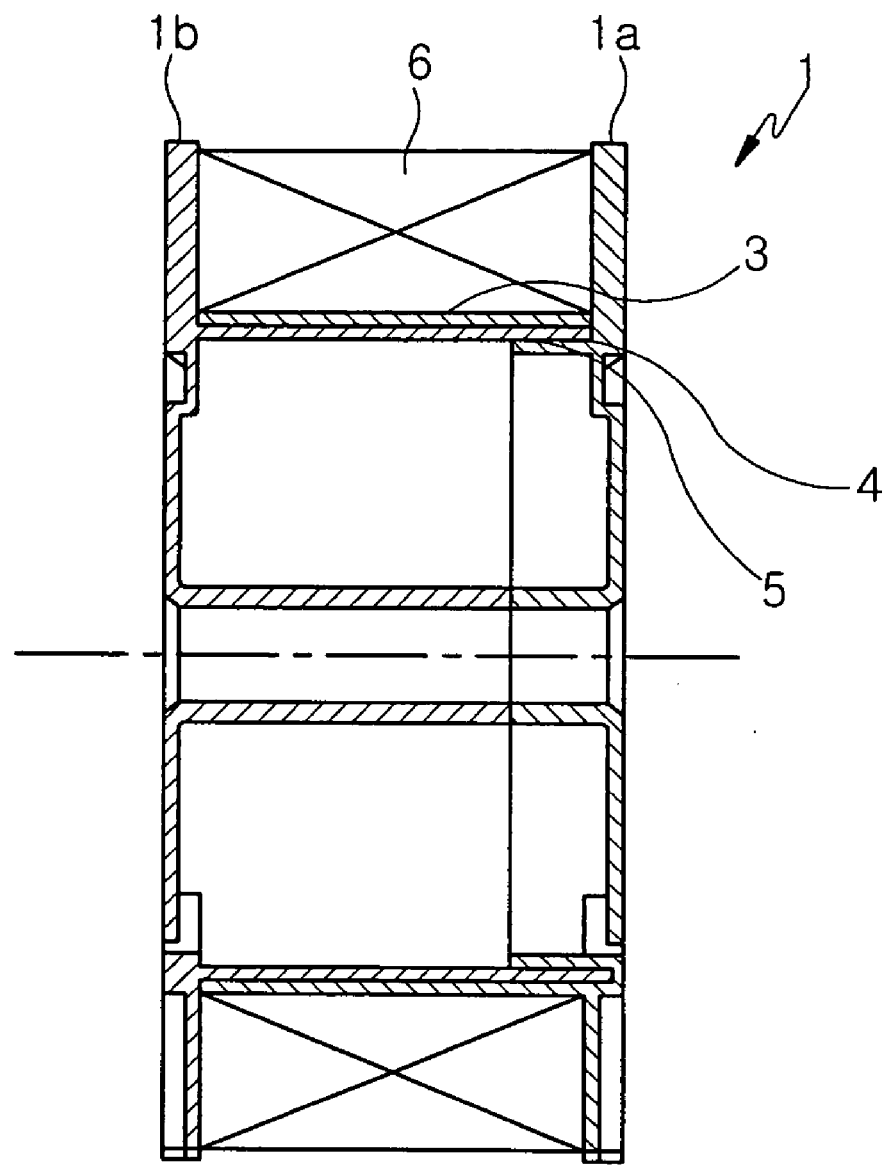
FIG. 2 is a sectional view taken along the line I–I' of FIG. 1.
Figure 3:
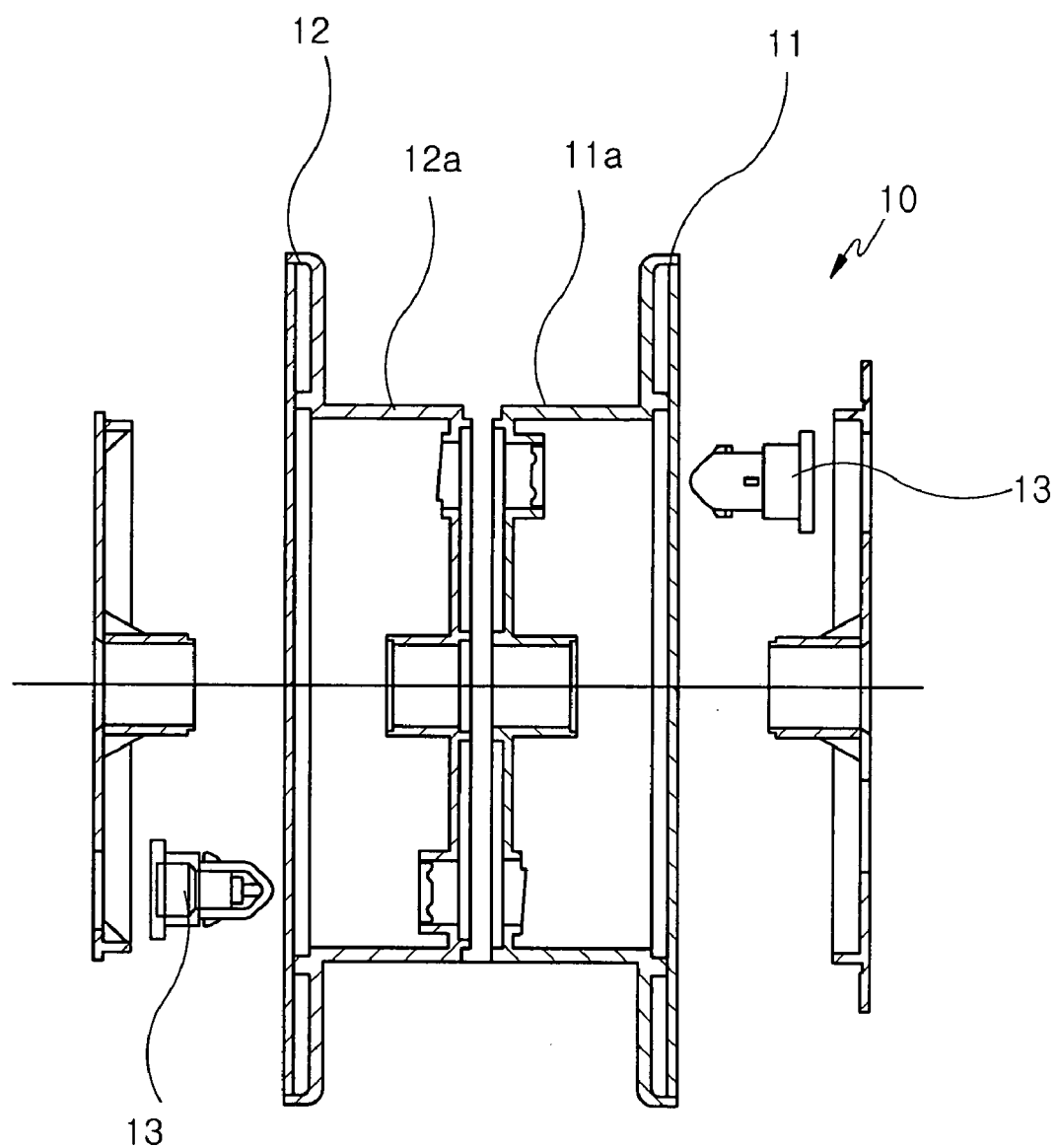
FIG. 3 is a longitudinal-sectional view of another conventional spool for winding an optical fiber.

Preferred embodiments of the present invention will be described in detail with reference to the annexed drawings.

As shown in FIGS. 4 to 8, a spool assembly 100 for winding an optical fiber 1000 comprises first and second flanges 200, 300, and first and second cylindrical barrels 201, 301, on which the optical fiber 1000 is wound. A junction is formed by mutually engaging the first and second cylindrical barrels 201, 301 in an axial direction face-to-face and fusing the barrels together. The first and second flanges 200, 300 are formed in the shape of concentric disks that sandwich and protrude radially from the first and second cylindrical barrels 201, 301 to restrict the winding area of the optical fiber 1000. The first and second flanges 200, 300 include subsidiary barrels 203, 303 and are sandwiched by and formed integrally with the subsidiary barrels 203, 303 to assist in the proper winding of the optical fiber 1000 onto the spool assembly 100. A start end of the optical fiber 1000 is drawn into and out of the first and second flanges 200, 300 by means of through holes 202, 302 in the first and second flanges 200, 300. The first and second flanges 200, 300 further include guide ribs 204, 304 that extend radially inward from the through holes 202, 302 to the subsidiary barrels 203, 303, to guide the optical fiber 1000 to the first and second barrels 201, 301 and the subsidiary barrels 203, 303, when the optical fiber 1000 is drawn into and out of the first and second flanges 200, 300. The guide ribs 204, 304 are arc-shaped so as to prevent the optical fiber 1000 from bending during the drawing of the optical fiber 1000 into and out of the first and second flanges 200, 300. The first and second flanges 200, 300 have external wings 205, 305 that extend perpendicularly outward from a concentric circle of the cylindrical barrels 201, 301. Also included in the first and second flanges 200, 300 are reinforcing ribs 206, 306 which are formed radially on outer surfaces of the external wings 205, 305 to reinforce the external wings 205, 305. A cylindrical hub 600 is formed through the first and second flanges 200, 300 along a central axis of the flanges 200, 300. The first and second flanges 200, 300 are made of plastic with excellent abrasion resistance, corrosion resistance, and electrical insulation properties, such as any of the synthetic resins polyamide, polyacetal, ABS, etc.

Figure 4:
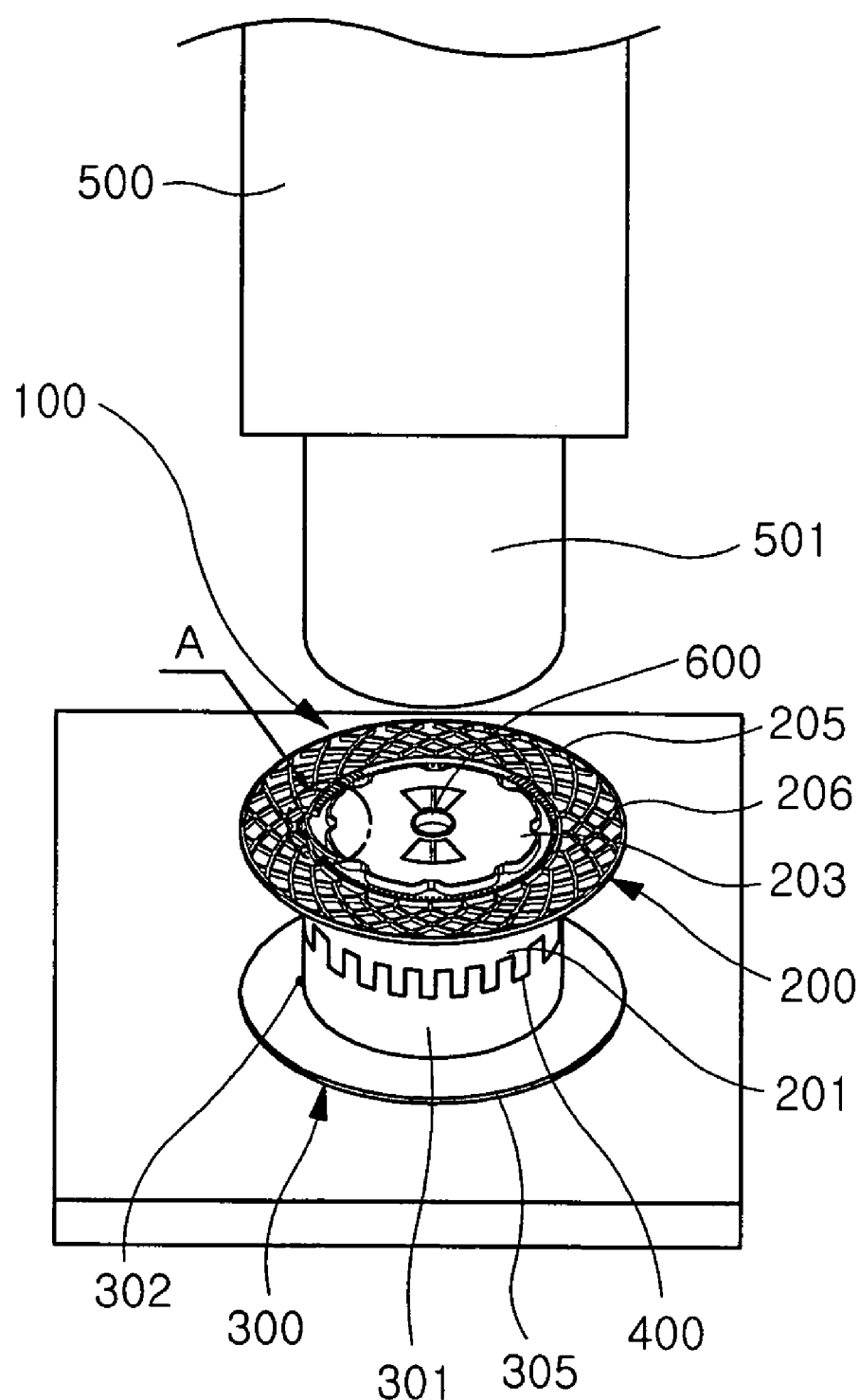
FIG. 4 is a perspective view of a spool for winding an optical fiber in accordance with one embodiment of the present invention in a state when an ultrasonic fusion splicer is in operation.
Figure 5:
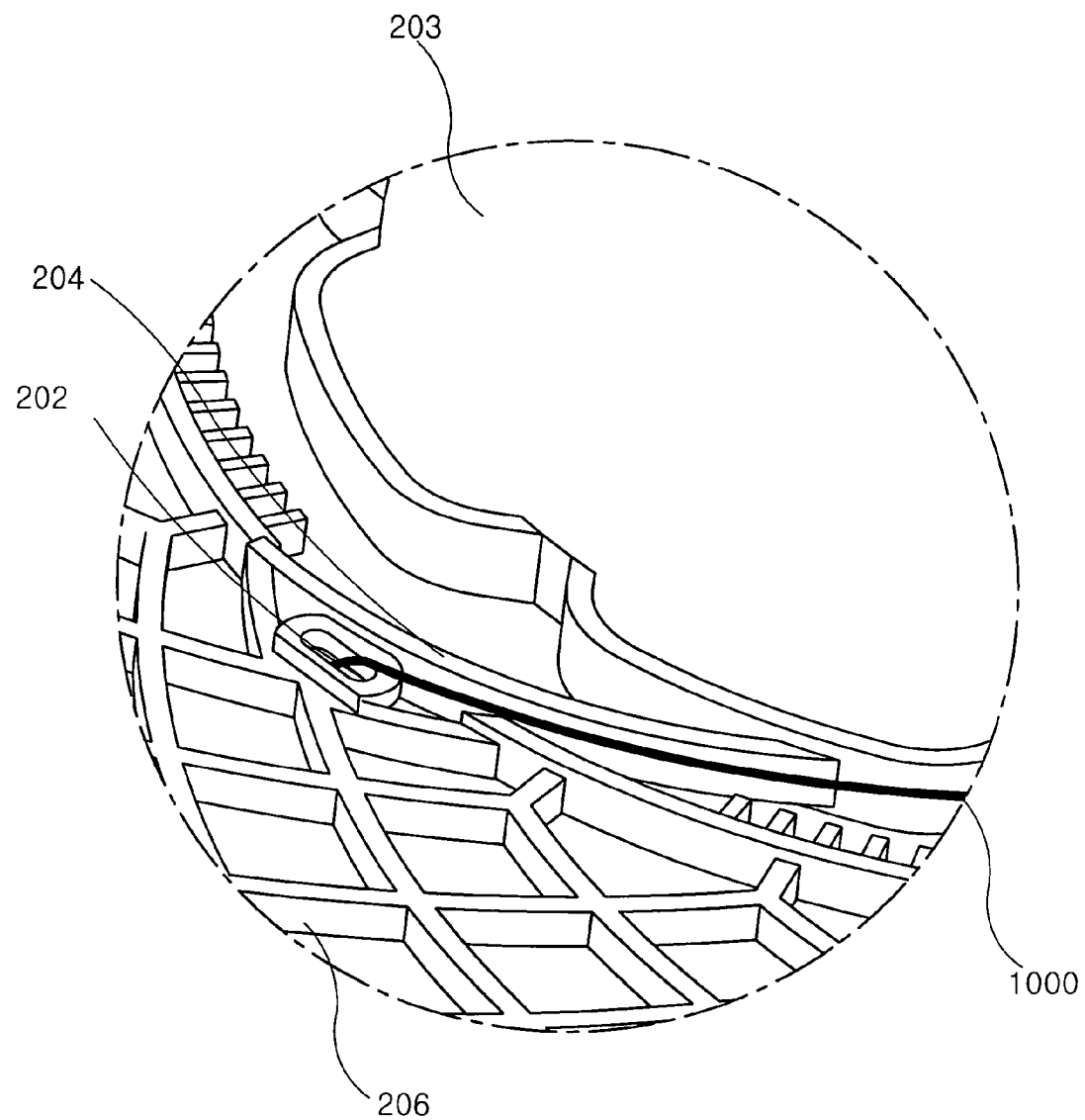
FIG. 5 is an enlarged perspective view of a portion "A" of FIG. 4.
Figure 6:
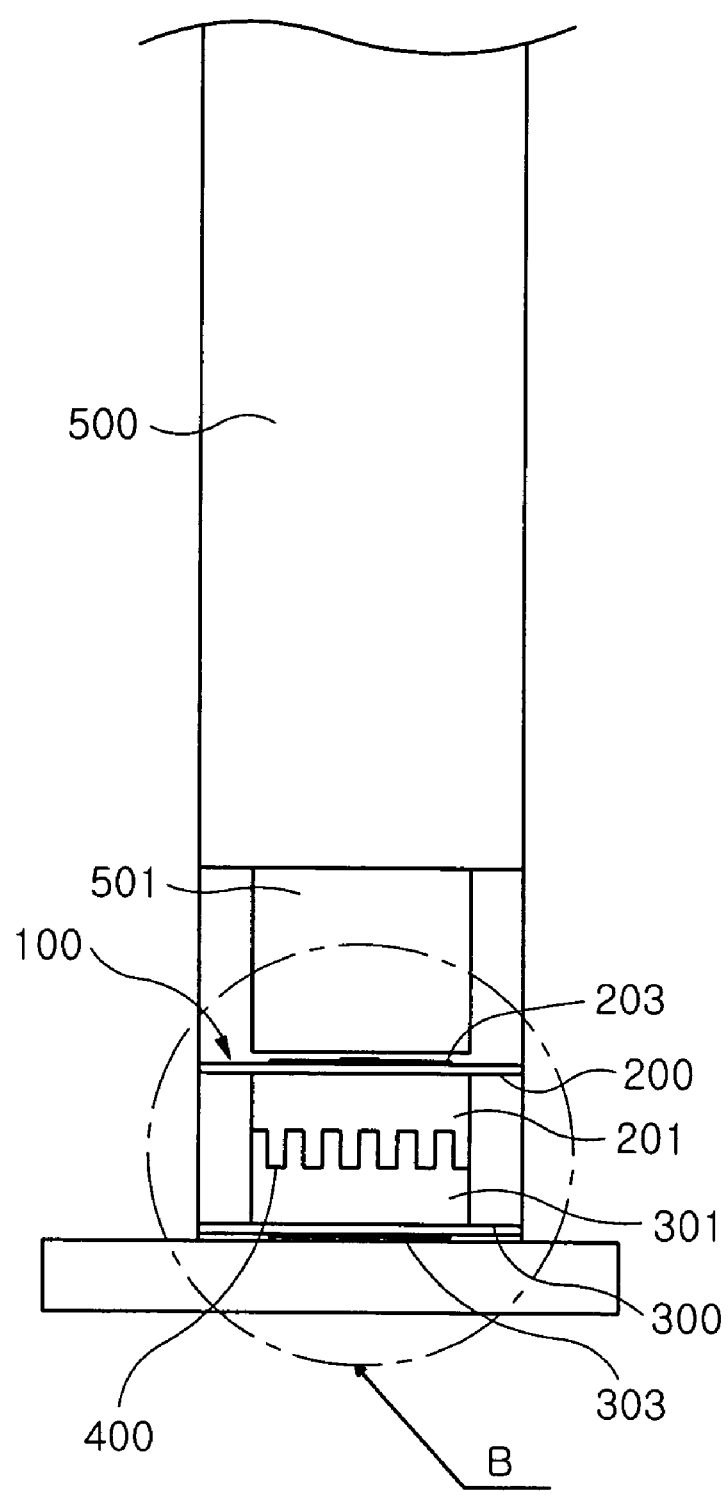
FIG. 6 is a front view of the spool for winding the optical fiber in accordance with one embodiment of the present invention in the state when an ultrasonic fusion splicer is in operation.
Figure 7:
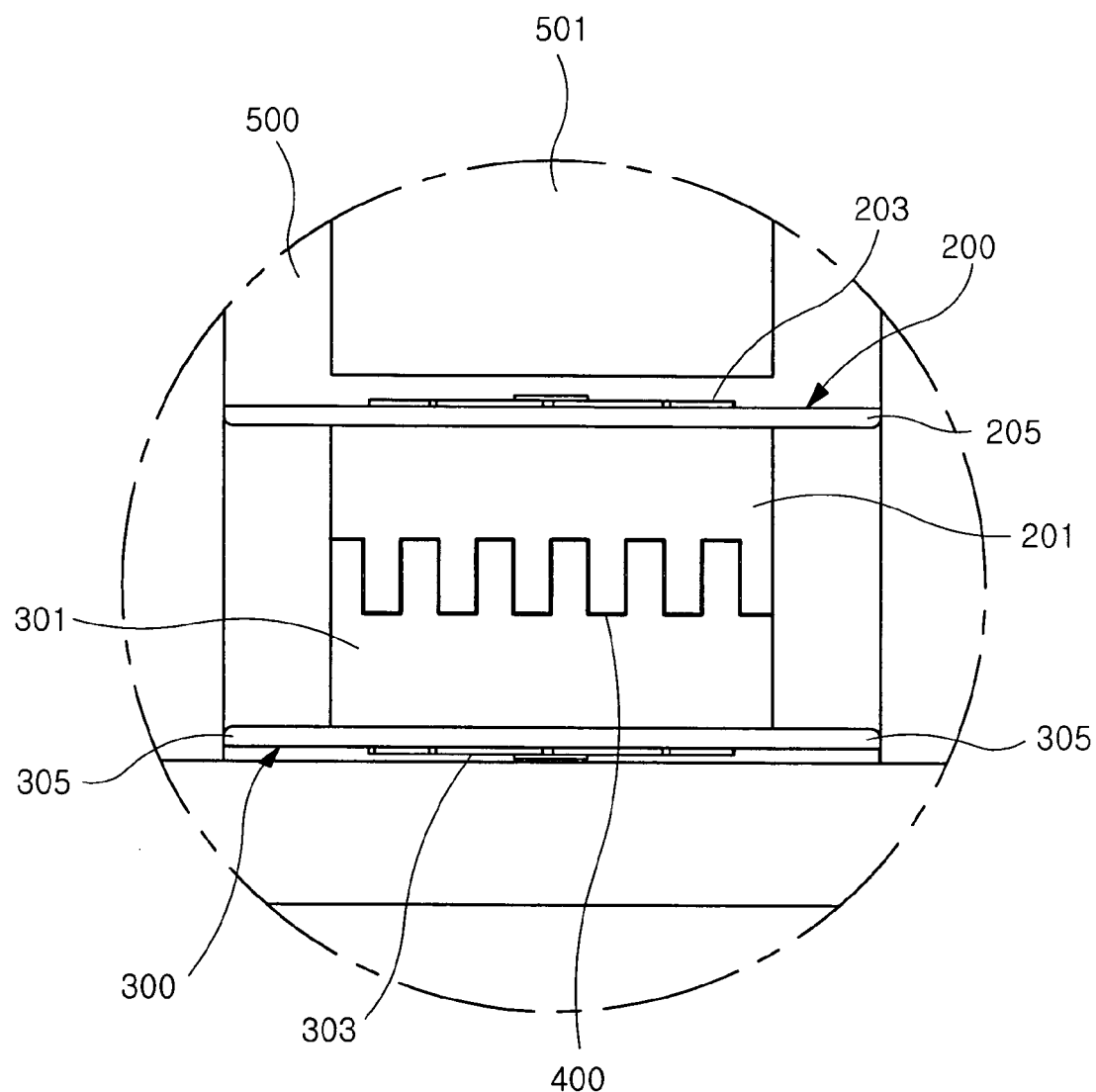
FIG. 7 is an enlarged front view of a portion "B" of FIG. 6.
Figure 8:
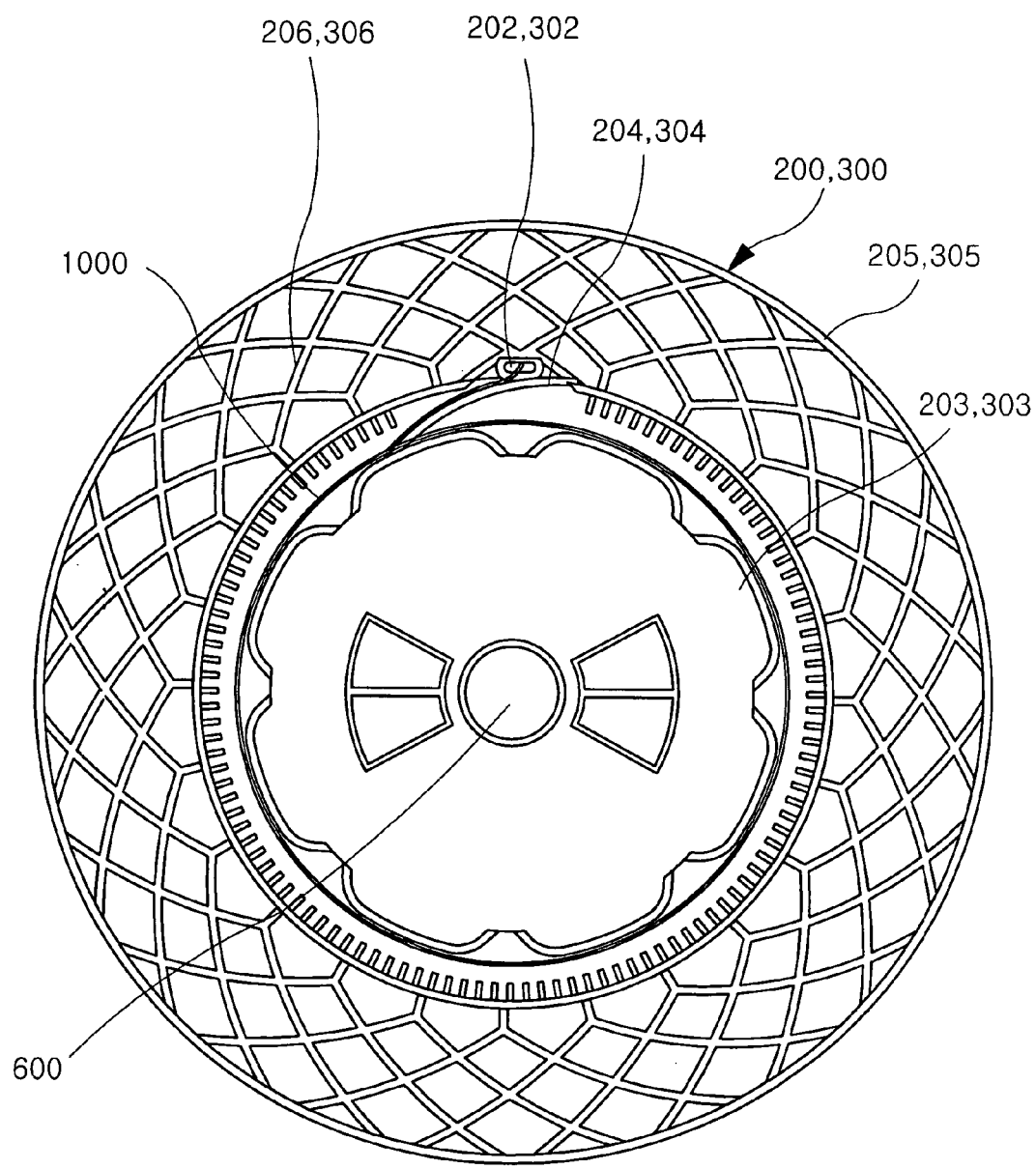
FIG. 8 is a cross-sectional view of the spool for winding the optical fiber in accordance with one embodiment of the present invention.

In forming the junction between the barrels 201, 301, the barrels are brought and a head 501 of an ultrasonic fusion splicer 500 is located on one side of first and second cylindrical barrels. An ultrasonic wave is then transmitted from the head 501 to form ultrasonic fusion splicing points 400 so as to fusion splice the first and second flanges 200 and 300 together by oscillation of the ultrasonic wave. As can be seen in FIGS. 4, 6 and 7, the junction formed has a zigzag pattern or is otherwise uneven along ends of the first and second cylindrical barrels 201, 301.

In a exemplary method of using the spool assembly 100, a start end of the optical fiber 1000 is drawn through the through hole 202 and then the through hole 302. The optical fiber 1000 is wound around subsidiary barrel 303, second cylindrical barrels 301 and first cylindrical barrel 201. Unwinding proceeds from subsidiary barrel 303, second cylindrical barrel 301, first cylindrical barrel 201. Alternatively, either one or both of the winding and unwinding operations can occur in the opposite direction.

As described above, since the first and second flanges 200, 300 of the spool assembly 100 are attached to each other using the ultrasonic fusion splicer 500, the assembly process of the spool is simplified, quality of the spool assembly is improved and the winding capacity of the optical fiber on the spool is increased.

Although only a few embodiments of the present invention have been described in detail, those skilled in the art will appreciate that various modifications, additions, and substitutions to the specific elements are possible, without departing from the scope and spirit of the invention as disclosed in the accompanying claims.

An ultrasonic fusion splicer is located on one side of first and second cylindrical barrels, thereby improving an ultrasonic fusion splicing points of first and second cylindrical barrels.

What is claimed is:

1. A spool for winding an optical fiber, comprising:
   first and second cylindrical barrels for winding the optical fiber thereon, the barrels being axially engaged face-to-face at a juncture;
   first and second flanges configured for restricting a winding area of the optical fiber by having a disk shape, being disposed to sandwich the barrels and being dimensioned to radially protrude from the barrels, wherein at least one of the flanges contains a through hole and each flange contains a subsidiary barrel at an outer surface;
   a ultrasonic fusion splicing points formed along said juncture by setting a head of an ultrasonic fusion splicer on one side of first and second cylindrical barrels and by transmitting an ultrasonic wave from the head to the juncture so as to fusion splice the first and second flanges together; and
   a guide rib formed from the through hole to the subsidiary barrel.

2. The spool for winding an optical fiber as set forth in claim 1, wherein each of the first and second barrels has an end, an axial engagement occurring at the ends, the juncture being uneven along said ends.

3. The spool for winding an optical fiber as set forth in claim 2, wherein the juncture is configured in a zigzag pattern.

4. The spool for winding an optical fiber as set forth in claim 1,
   wherein the optical fiber has a start end; and
   wherein the through hole passes the start end of the optical fiber.

5. The spool for winding an optical fiber as set forth in claim 4, wherein said at least one of the first and second flanges includes both flanges.

6. The spool for winding an optical fiber as set forth in claim 4, wherein at least one of the first and second flanges has an outer surface, a subsidiary barrel formed on said outer surface, and a guide rib formed from the through hole to the subsidiary barrel to guide the optical fiber to the subsidiary barrel.

7. The spool for winding an optical fiber as set forth in claim 6, wherein the guide rib extends radially to guide movement of the optical fiber between the subsidiary barrel and the through hole of the respective flange.

8. The spool for winding an optical fiber as set forth in claim 7, wherein the guide rib is curved in an arc shape.

9. The spool for winding an optical fiber as set forth in claim 1, wherein each of the guide ribs extends radially to guide movement of the optical fiber between the subsidiary barrel and the through hole of the respective flange.

10. The spool for winding an optical fiber as set forth in claim 9, wherein each guide rib is curved in an arc shape.

11. The spool for winding an optical fiber as set forth in claim 1, wherein the first and second flanges are made of plastic.

12. The spool for winding an optical fiber as set forth in claim 1, wherein the barrels are mutually axially aligned.

13. The spool for winding an optical fiber as set forth in claim 1, wherein optical fiber is wound around at least one of the first and second cylindrical barrels.

14. A spool for winding an optical fiber, comprising:
   first and second cylindrical barrels for winding the optical fiber thereon, the barrels being axially engaged face-to-face at a juncture;
   first and second flanges configured for restricting a winding area of the optical fiber by being disposed to sandwich the barrels and being dimensioned to radially protrude from the barrels, wherein at least one of the flanges contain a through hole and each flange contains a subsidiary barrel at an outer surface thereon;
   ultrasonic fusion splicing points formed along said juncture so as to fusion splice the first and second flanges together; and
   a guide rib formed from the through hole to the subsidiary barrel.

15. The spool for winding an optical fiber as set forth in claim 14, wherein each of the first and second barrels has an end, an axial engagement occurring at the ends, the juncture being uneven along said ends.

16. The spool for winding an optical fiber as set forth in claim 15, wherein the juncture is configured in a zigzag pattern.

17. The spool for winding an optical fiber as set forth in claim 15, wherein the optical fiber has a start end; and
wherein at least one of the first and second flanges passes the start end of the optical fiber.

18. The spool for winding an optical fiber as set forth in claim 17, wherein said at least one of the first and second flanges includes both flanges.

19. The spool for winding an optical fiber as set forth in claim 14, wherein the first and second flanges are made of plastic.

* * * * *